US011498865B2

(12) United States Patent
Bookbinder et al.

(10) Patent No.: US 11,498,865 B2
(45) Date of Patent: Nov. 15, 2022

(54) UV BLOCKING FOR IMPROVED TRANSMISSION GLASSES

(71) Applicant: CORNING INCORPORATED, Corning, NY (US)

(72) Inventors: Dana Craig Bookbinder, Corning, NY (US); Nicholas Francis Borrelli, Elmira, NY (US); Matthew John Dejneka, Corning, NY (US); Timothy Michael Gross, Corning, NY (US); Xiaoju Guo, Painted Post, NY (US); Ronald Leroy Stewart, Fisherville, VA (US)

(73) Assignee: CORNING INCORPORATED, Corning, NY (US)

( * ) Notice: Subject to any disclaimer, the term of this patent is extended or adjusted under 35 U.S.C. 154(b) by 153 days.

(21) Appl. No.: 16/681,960

(22) Filed: Nov. 13, 2019

(65) Prior Publication Data
US 2020/0079682 A1  Mar. 12, 2020

Related U.S. Application Data

(62) Division of application No. 14/865,295, filed on Sep. 25, 2015, now Pat. No. 10,501,365.

(60) Provisional application No. 62/055,275, filed on Sep. 25, 2014.

(51) Int. Cl.
*C03C 3/093* (2006.01)
*C03C 3/097* (2006.01)
*C03C 3/085* (2006.01)
*C03C 3/087* (2006.01)
*C03C 3/091* (2006.01)
*C03C 4/08* (2006.01)

(52) U.S. Cl.
CPC ............ *C03C 3/097* (2013.01); *C03C 3/085* (2013.01); *C03C 3/087* (2013.01); *C03C 3/091* (2013.01); *C03C 3/093* (2013.01); *C03C 4/085* (2013.01)

(58) Field of Classification Search
CPC ......... C03C 3/085; C03C 3/087; C03C 3/091; C03C 21/02; C03C 21/002; C03C 3/093; C03C 3/097; C03C 4/085
See application file for complete search history.

(56) References Cited

U.S. PATENT DOCUMENTS

| | | | | |
|---|---|---|---|---|
| 3,850,787 A ‡ | 11/1974 | Robinson | ................ | C03B 18/04 428/22 |
| 4,287,380 A ‡ | 9/1981 | Fairbanks | ................ | H05B 3/03 373/36 |
| 4,429,402 A ‡ | 1/1984 | Carley | .................... | C03B 5/027 373/37 |
| 4,433,419 A ‡ | 2/1984 | Williamson | ............ | H05B 3/03 373/37 |
| 4,862,477 A ‡ | 8/1989 | Olds | ..................... | C03B 5/0275 373/85 |
| 5,151,918 A ‡ | 9/1992 | Argent | ..................... | C03B 5/43 373/27 |
| 5,153,151 A ‡ | 10/1992 | Aitken | ..................... | C03C 3/16 501/45 |
| 5,851,939 A ‡ | 12/1998 | Miwa | ..................... | C03C 3/091 501/70 |
| 5,895,768 A ‡ | 4/1999 | Speit | ...................... | C03C 1/004 428/84 |
| 5,932,501 A ‡ | 8/1999 | Brocheton | ............. | C03C 3/068 501/56 |
| 6,329,310 B1 ‡ | 12/2001 | Peuchert | ................ | C03C 3/091 501/64 |
| 6,417,124 B1 | 7/2002 | Peuchert et al. | | |
| 6,465,381 B1 ‡ | 10/2002 | Lautenschlager | ....... | C03C 3/095 501/27 |
| 6,548,434 B2 ‡ | 4/2003 | Nagashima | ............ | C03C 3/087 501/64 |
| 7,435,696 B2 ‡ | 10/2008 | Scheffler-Hudlet | ..... | C03C 3/087 501/64 |
| 7,563,737 B2 ‡ | 7/2009 | Fechner | .................. | C03C 3/087 501/69 |
| 7,666,511 B2 ‡ | 2/2010 | Ellison | .................... | C03B 17/06 428/42 |
| 8,168,295 B2 ‡ | 5/2012 | Murata | ................... | C03C 3/083 428/40 |
| 8,312,739 B2 ‡ | 11/2012 | Lee | ......................... | C03C 3/093 65/30 |
| 8,361,915 B2 ‡ | 1/2013 | Cid-Aguilar | ............ | C03C 3/087 501/71 |
| 8,561,429 B2 ‡ | 10/2013 | Allan | ..................... | C03C 3/085 501/66 |

(Continued)

FOREIGN PATENT DOCUMENTS

CN  1285325 A  2/2001
CN  1176867 C  11/2004
(Continued)

OTHER PUBLICATIONS

English Translation of CN201580063781.1 First Office Ation dated Jun. 20, 2019, China Patent Office, 12 PGS.‡
Moncke et al.; "UV light induced photoreduction in phosphate and fluoride-phosphate glasses doped with Ni2+, Ta5+, Pb2+ and Ag+ compounds"; Glass Sci. Technol. 77 (2004) No. 5, pp. 239-248.‡
Ebeling et al.; "Influence of modifier cations on the radiation-induced effects of metaphosphate glasses"; Glass Sci. Technol. 76 (2003) No. 2 pp. 56-61.‡
PCT/US15/052103 Search Report dated Dec. 3, 2015.‡
(Continued)

*Primary Examiner* — Elizabeth A. Bolden
(74) *Attorney, Agent, or Firm* — Kevin M. Johnson

(57) ABSTRACT

Embodiments are directed to glass articles which are resistant to UV photodarkening, the glass articles having a thickness ≤1.3 mm and comprise UV absorbers such as Ti, V, Mn, Fe, Cu, Ce, Ge, Mo, Cr, Co and Ni, and combinations thereof, or alternatively comprising ZnO or $SnO_2$.

14 Claims, 8 Drawing Sheets

(56) References Cited

U.S. PATENT DOCUMENTS

| | | | |
|---|---|---|---|
| 8,652,979 B2 ‡ | 2/2014 | Murata | C03C 3/083 428/40 |
| 2005/0151116 A1 ‡ | 7/2005 | Fechner | C03C 3/091 252/186.1 |
| 2005/0250639 A1 ‡ | 11/2005 | Siebers | C03C 3/083 501/68 |
| 2009/0197088 A1 ‡ | 8/2009 | Murata | C03C 3/083 428/41 |
| 2009/0253567 A1 ‡ | 10/2009 | Nagai | C03B 18/20 501/70 |
| 2010/0011057 A1 ‡ | 1/2010 | Ganai | G06F 9/5066 709/20 |
| 2010/0035745 A1 ‡ | 2/2010 | Murata | C03C 3/083 501/66 |
| 2011/0201490 A1 ‡ | 8/2011 | Barefoot | C03C 21/002 501/66 |
| 2011/0294648 A1 ‡ | 12/2011 | Chapman | C03C 3/097 501/63 |
| 2012/0052271 A1 ‡ | 3/2012 | Gomez | C03C 3/091 428/213 |
| 2012/0058306 A1 ‡ | 3/2012 | Miwa | C03C 3/091 428/14 |
| 2013/0047672 A1 ‡ | 2/2013 | Comte | C03C 3/093 65/33 |
| 2013/0122313 A1 ‡ | 5/2013 | Gross | C03C 3/064 428/42 |
| 2013/0178355 A1 ‡ | 7/2013 | Nagai | C03C 3/087 501/70 |
| 2013/0231236 A1 ‡ | 9/2013 | Kawai | C03C 3/097 501/63 |
| 2014/0087194 A1 ‡ | 3/2014 | Dejneka | C03C 3/091 428/410 |
| 2015/0232380 A1 ‡ | 8/2015 | Bookbinder | C03C 17/002 204/19 |
| 2015/0307389 A1 ‡ | 10/2015 | He | G02B 5/226 359/36 |
| 2015/0368149 A1 ‡ | 12/2015 | Guo | C03C 4/02 428/220 |

FOREIGN PATENT DOCUMENTS

| | | | | |
|---|---|---|---|---|
| CN | 101074146 A | | 11/2007 | |
| CN | 103641309 A | | 3/2014 | |
| DE | 19939789 A1 | | 2/2001 | |
| EP | 2075237 A1 | | 7/2009 | |
| JP | 2001-048573 A | | 2/2001 | |
| JP | 2001-106546 A | | 4/2001 | |
| JP | 2005-320234 A | | 11/2005 | |
| JP | 2013-536155 A | | 9/2013 | |
| JP | 2014001094 A | * | 1/2014 | C03C 3/083 |
| TW | 201427917 A | | 7/2014 | |
| WO | 2010/128673 A1 | | 11/2010 | |
| WO | WO-2012126394 A1 | * | 9/2012 | C03C 10/0054 |
| WO | 2013191110 A1 | | 12/2013 | |
| WO | WO-2013191110 | ‡ | 12/2013 | |
| WO | 2014120641 A2 | | 8/2014 | |
| WO | WO-2014120641 | ‡ | 8/2014 | |

OTHER PUBLICATIONS

Japanese Patent Application No. 2017516308; Machine Translation of the Office Action dated Sep. 11, 2019; Japan Patent Office; 5 PGS.‡

Taiwanese Patent Application No. 108118895, Office Action dated Nov. 10, 2020, 4 pages (English Translation Only); Taiwanese Patent Office.

Ebeling et al., "Influence of modifier cations on the radiation-induced effects of metaphosphate glasses" Glass Sci. Technol. 76 (2003) 56-61.

International Search Report and Written Opinion PCT/US2015/052103 dated Dec. 3, 2015.

Moncke and Ehrt, "UV light induced photoreduction in phosphate and flouride-phosphate glasses doped with Ni2+, Ta5+, Pb2+, and Ag+ compounds" Glass Sci. Technol. 77 (2004), 239-248.

Chinese Patent Application No. 201580063781.1, Office Action dated Jan. 6, 2021, 3 pages (English Translation Only); Chinese Patent Office.

\* cited by examiner

‡ imported from a related application

UV BLOCKING FOR IMPROVED TRANSMISSION GLASSES

This application is a divisional of patent application Ser. No. 14/865,295 filed on Sep. 25, 2015, which claims the benefit of priority under 35 U.S.C. § 119 of U.S. Provisional Application Ser. No. 62/055,275, filed on Sep. 25, 2014, the content of which is relied upon and incorporated herein by reference in its entirety.

BACKGROUND

The present disclosure is generally related to glass articles and specifically related to glass articles used as cover or display glass, which are resistant to ultraviolet (UV) photodarkening.

Glasses, for example, strengthened glasses may be used as cover plates or windows for portable or mobile electronic communication and entertainment devices, such as cellular phones, smart phones, tablets, video players, information terminal (IT) devices, laptop computers and the like. As used herein, the term "cover plate" or "cover glass" includes windows or the like for display and touch screen applications, as well as in other applications requiring transparency, high strength and abrasion resistance. Additionally, the cover glass may be used as decorative pieces such as the back and side surfaces of electronic devices. Additionally, other glasses, which have not been chemically strengthened, are utilized as display glasses.

It has been found that exposure to ultraviolet light produces discoloration in the glass, thereby affecting the clarity and resolution of the display glass. As glass is increasingly being utilized in such electronic devices, it has become more important to develop glass articles which maintain color clarity and a clear display resolution.

SUMMARY

Embodiments of the present disclosure are directed to glass articles having UV absorbers that minimally reduce or eliminate UV photodarkening of the glass article. As used herein, "UV photodarkening" refers to discoloration in glass articles upon exposure to UV light.

According to one embodiment, a glass article is provided. The glass article has a thickness ≤1.3 mm and comprises: 54-75 mol % $SiO_2$; 8-17 mol % $Al_2O_3$; at least one of $B_2O_3$ and $P_2O_5$, wherein 0.1 mol %≤$B_2O_3+P_2O_5$≤19 mol %; 10-20 mol % $R_2O$, wherein $R_2O$ comprises one or more of $Na_2O$, $K_2O$, and $Li_2O$; above 0 to 1 mol % $SnO_2$; and an inorganic UV absorber. The inorganic UV absorber may comprises: 0.1-1.0 mol % of one or more metal ions or oxides thereof, wherein the metal ions are selected from the group consisting of Ti, V, Mn, Fe, Cu, Ce, Ge, and combinations thereof; above 0 to 500 ppm by wt. of one or more metals or oxides thereof, wherein the metals are selected from the group consisting of Mo, Cr, Co and Ni; or combinations thereof.

According to another embodiment, the glass article, which has a thickness ≤1.3 mm, comprises 0-12 mol % $B_2O_3$; 0-7 mol % $P_2O_5$; and 3 mol %≤$B_2O_3+P_2O_5$≤15 mol %; and an inorganic UV absorber.

According to yet another embodiment, a glass article that is substantially free of alkali metals and oxides is provided. The alkali-free glass comprises 65-74 mol % $SiO_2$; 11-13 mol % $Al_2O_3$; 11-16 mol % RO, wherein RO is one or more of MgO, CaO, SrO, BaO and ZnO; 2-11 mol % $B_2O_3$; above 0 to 1 mol % $SnO_2$; and an inorganic UV absorber, wherein the inorganic UV absorber comprises: 0.1-1.0 mol % of one or more metal ions or oxides thereof, wherein the metal ions are selected from the group consisting of Ti, V, Mn, Fe, Cu, Ce, Ge, and combinations thereof; above 0 to 500 ppm by wt. of one or more metals or oxides thereof, wherein the metals are selected from the group consisting of Mo, Cr, Co and Ni; or combinations thereof.

Further embodiments are directed to ZnO UV absorbers. For example, in one embodiment, the glass article comprises: 54-75 mol % $SiO_2$; 8-17 mol % $Al_2O_3$; 0.1-9 mol % $B_2O_3$; optionally $P_2O_5$, wherein 0.1 mol %≤$B_2O_3+P_2O_5$≤19 mol %; 10-20 mol % $R_2O$, wherein $R_2O$ comprises one or more of $Na_2O$, $K_2O$, and $Li_2O$; above 0 to 1 mol % $SnO_2$; and 0.5-10 mol % ZnO.

In a further embodiment, the glass article comprises: 54-75 mol % $SiO_2$; 8-14 mol % $Al_2O_3$; 0-12 mol % $B_2O_3$; 0.1-7 mol % $P_2O_5$; 10-20 mol % $R_2O$, wherein $R_2O$ comprises one or more of $Na_2O$, $K_2O$, or $Li_2O$; 3 mol %≤$B_2O_3+P_2O_5$ 5≤15 mol %; and 0.5-10 mol % ZnO.

According to yet another embodiment, the glass article is substantially free of alkali metals and oxides and comprises: 65-74 mol % $SiO_2$; 11-13 mol % $Al_2O_3$; 11-16 mol % RO, wherein RO is one or more of MgO, CaO, SrO, BaO and ZnO, and wherein the glass article comprises 0.5-10 mol % ZnO; 2-11 mol % $B_2O_3$; and above 0 to 1 mol % $SnO_2$.

BRIEF DESCRIPTION OF THE DRAWINGS

The following detailed description of specific embodiments of the present disclosure can be best understood when read in conjunction with the drawings enclosed herewith.

Figure 1:
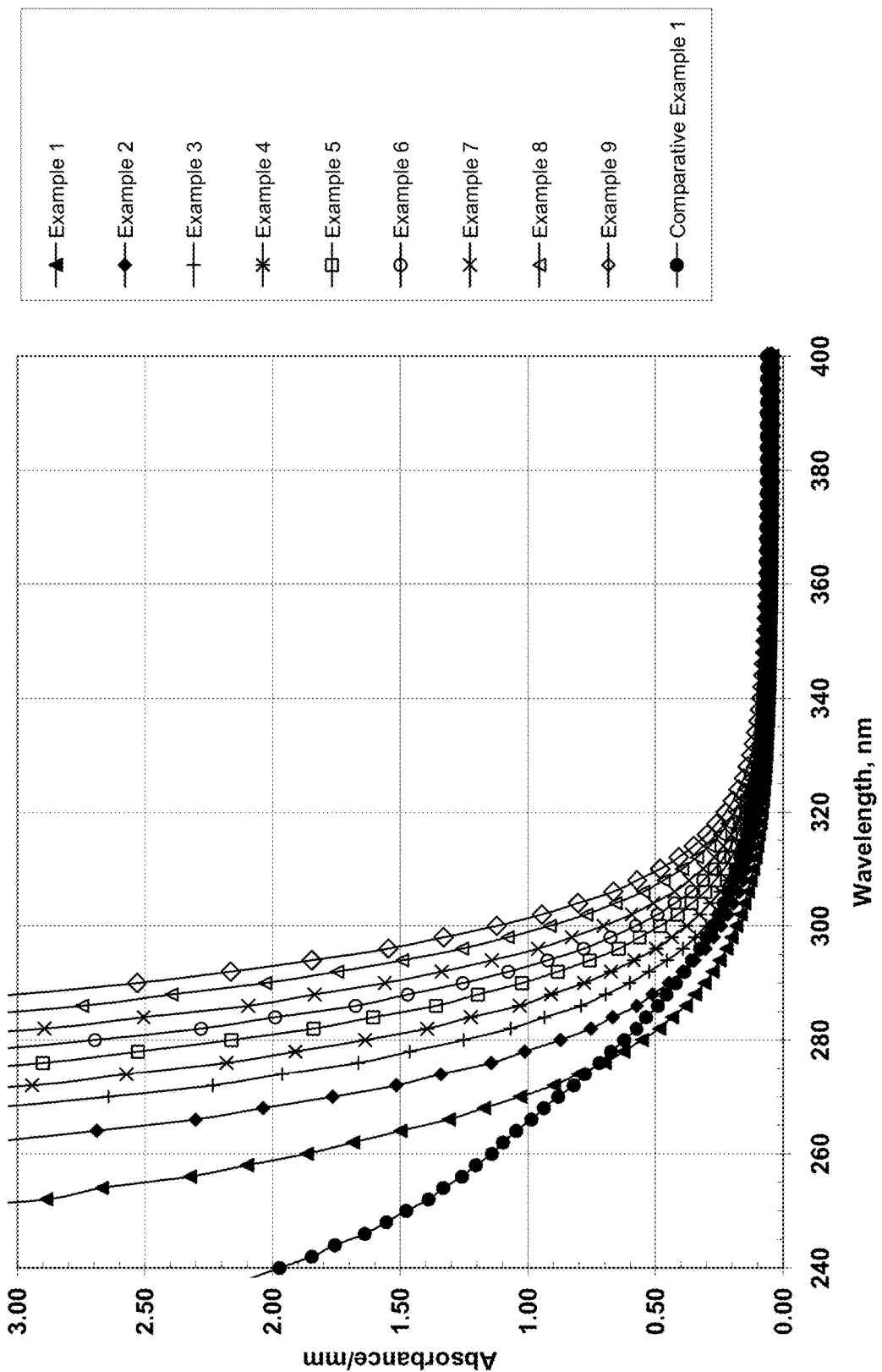
FIG. 1 is a graphical illustration depicting the effect of $TiO_2$ on the absorbance/mm of the glasses in Table 1 before and after UV exposure.

The embodiments set forth in the drawings are illustrative in nature and not intended to be limiting of the invention defined by the claims. Moreover, individual features of the drawings will be more fully apparent and understood in view of the detailed description.

DETAILED DESCRIPTION

Embodiments of the glass articles comprise UV absorbers suitable to reduce UV photodarkening. Many UV absorbers are contemplated for reducing UV photodarkening in glass articles albeit with the prerequisite that these UV absorbers are not prone to photodarkening themselves. Without being bound by theory, lower levels of UV absorber may significantly reduce or eliminate photodarkening in various glasses, whether strengthened or non-strengthened. In specific embodiments, reduced UV photodarkening is achieved for aluminosilicate glass. In one or more embodiments, the aluminosilicate glass may be an alkali aluminosilicate, an alkali-free aluminosilicate, an aluminoborosilicate, or an aluminophosphosilicate glass.

In one embodiment, the inorganic UV absorber may comprise one or more metals or oxides of Ti, V, Cr, Mn, Fe, Co, Ni, Cu, Mo, Ce, Ge, or combinations thereof. In specific embodiments, the inorganic UV absorber may comprise 0.1-1.0 mol % of one or more metal ions or oxides thereof, wherein the metal ions are selected from the group consisting of Ti, V, Mn, Fe, Cu, Ce, Ge, and combinations thereof. As an alternative to these UV absorbers, it may be desirable for other metal UV absorbers to include lesser amounts inside the glass. For example, the inorganic UV absorber may include above 0 (i.e., greater than zero) to 500 ppm by wt. or less of one or more metals or oxides thereof, wherein the metals are selected from the group consisting of Mo, Cr, Co and Ni, or combinations thereof. In yet another embodiment, the inorganic UV absorber may comprise 150 ppm by wt. or less of one or more metals or oxides thereof, wherein the metals are selected from the group consisting of Mo, Cr, Co and Ni.

In an exemplary embodiment, the inorganic UV absorber is $TiO_2$. Various amounts of UV absorber are contemplated herein. For example, the glass article may comprise 0.1-2 mol % of inorganic UV absorbers, or 0.1-1 mol % of inorganic UV absorbers, or 0.2-1 mol % of inorganic UV absorbers, or about 0.3-0.9 mol % of inorganic UV absorbers. In specific exemplary embodiments, the glass article may comprise 0.2-1 mol % $TiO_2$, or about 0.3-0.9 mol % $TiO_2$. While most of the examples below depict the impact of $TiO_2$, it is shown in the accompanying figures and described below that beneficial impacts may be achieved by other UV absorbers such as $Sb_2O_3$, $CeO_2$, $Fe_2O_3$, etc.

An alternative approach is doping glass with zinc that is resistant to induced coloration when exposed to ultraviolet (UV) light or plasma cleaning processes. The zinc addition can be applied to any glass composition to prevent the coloration due to color center formation during deep UV exposure or by plasma cleaning. While higher amounts are also contemplated, the glass may comprise 0.5-10 mol % ZnO, or 1-10 mol % ZnO, or 2-10 mol % ZnO, or 3-10 mol % ZnO, or 5-10 mol % ZnO in one or more embodiments.

Without being bound by theory, substituting ZnO for MgO is advantageous because ZnO provides added resistance to phase separation at heat treatments near the softening point.

Further without being bound by theory, the glass articles, which demonstrate reduced UV photodarkening, have a UV absorbance/mm ≥2 at spectrum wavelengths of about 270 nm and an induced absorbance of less than 0.025 in the visible spectrum upon exposure to UV radiation. As used herein, the visible spectrum encompasses wavelengths between 400 nanometers to 700 nanometers, and the ultraviolet (UV) spectrum encompasses wavelengths below the visible spectrum (i.e., 400 nm or less), specifically encompassing wavelengths between 100 and 400 nm. In further embodiments, the glass articles may have a UV absorbance/mm ≥2.2 at spectrum wavelengths of about 270 nm, or a UV absorbance/mm ≥2.5 at spectrum wavelengths of about 270 nm. In further embodiments, the glass may have an induced absorbance of 0.02 or less in the visible spectrum, or 0.01 or less in the visible spectrum.

As would be familiar to one of ordinary skill in the art, various UV radiation wavelengths could cause UV photodarkening in the glass articles unless UV absorbers are utilized. For example, without the utilization of UV absorbers, it may be possible to have UV photodarkening upon exposure to UV Ozone radiation having a range of wavelengths delivered for a period of 16 minutes at an irradiance of 28 mW cm-1.

Many glass thicknesses and compositions are contemplated. For example, the glass article may comprise a thickness ≤1.3 mm, or from 0.1 mm to 1.0 mm, or from 0.2 mm to 0.8 mm. In an exemplary embodiment, the thickness of the glass sheet is less than 0.7 millimeters and the area of each of the major surfaces are greater than 60 square centimeters.

As stated above, the present glass articles are aluminosilicate glasses, for example, an alkali aluminosilicate glass article. In one embodiment, the glass article comprises 54-75 mol % $SiO_2$, and 8-17 mol % $Al_2O_3$. Additionally, the glass article comprises at least one of $B_2O_3$ and $P_2O_5$, wherein 0.1 mol %≤$B_2O_3$+$P_2O_5$≤19 mol %. Further, the glass article comprises 12-20 mol % $R_2O$, wherein $R_2O$ comprises one or more of $Na_2O$, $K_2O$, and $Li_2O$.

Alternative component amounts are contemplated for the aluminosilicate glass article. For example, the glass article may comprise about 54-72 mol % $SiO_2$, or about 54-70 mol % $SiO_2$, or about 54-65 mol % $SiO_2$. Alternatively, the glass article may comprise about 63-75 mol % $SiO_2$. Moreover, the aluminosilicate glass article may comprise 8-14% $Al_2O_3$, or alternatively, other contemplated ranges such as 11-17 mol % $Al_2O_3$, or 11-13 mol % $Al_2O_3$. Moreover, the aluminosilicate glass article may comprise alkali amounts ranging from 13-19 mol % $R_2O$, or 14-18 mol % $R_2O$.

In the embodiment above, the aluminosilicate glass article may comprise 0.1 mol %≤$B_2O_3$+$P_2O_5$≤19; however, for aluminoborosilicates or aluminophosphosilicates, the glass articles may comprise 1 mol %≤$B_2O_3$+$P_2O_5$≤15, or 3 mol %≤$B_2O_3$+$P_2O_5$≤15 mol %, or 2 mol %≤$B_2O_3$+$P_2O_5$≤10, or 3 mol %≤$B_2O_3$+$P_2O_5$≤8. In specific embodiments, the aluminoborosilicates may comprise up to 8 mol % $B_2O_3$, or 2-8 mol % $B_2O_3$, whereas the aluminophosphosilicates may comprise up to 7 mol % $P_2O_5$, or 0.1-7 mol % $P_2O_5$, or 2-7 mol % $P_2O_5$. Moreover, the glass articles may define a sum of $Al_2O_3$+$B_2O_3$+$P_2O_5$>12 mol %, or a sum of $Al_2O_3$+$B_2O_3$+$P_2O_5$>16 mol %, or a sum of $Al_2O_3$+$B_2O_3$+$P_2O_5$>19 mol %.

In another embodiment, the glass articles may comprise alkaline earth components. These alkaline earth components may be included at amounts up to 17 mol % RO, wherein RO is one or more of MgO, CaO, SrO, BaO and ZnO. In further embodiments, the glass articles may comprise 0-7 mol % RO, or 0-4 mol % RO.

Moreover, the glass article composition may be defined by the equation: $-3.5<R_2O+RO-Al_2O_3<10$. In a further embodiment, the glass article may be defined by the equation: $-3.5<R_2O+RO-Al_2O_3<3.5$.

Additionally, the glass articles may comprise above 0 to 1 mol % Sn or $SnO_2$, or from 0.05-1 mol % Sn or $SnO_2$ or from 0.1-1 mol % Sn or $SnO_2$, or from 0.1-0.5 mol % Sn or $SnO_2$. In addition to Sn based fining agents, it is contemplated to use other fining agents such as $CeO_2$. With glass manufacturers, there has been an increased use of environmentally green fining agents, and a decrease in the use of environmentally toxic fining agents, such as $As_2O_3$ and $Sb_2O_3$. Thus, in one or more embodiments, the glass article may be substantially free of at least one of $As_2O_3$ or $Sb_2O_3$. Additional embodiments may also be substantially free of other fining agents such as fluorine. In addition to its efficacy as a fining agent, $SnO_2$ also is effective at reducing photodarkening. For example, the inclusion of $SnO_2$ results in an induced absorbance of about 0.02 at 400 nm.

The improved resistance to UV photodarkening may also be achieved for alkali-free aluminosilicate glass articles. These alkali-free aluminosilicate glass compositions may include 65-72 mol % $SiO_2$, 11-13 mol % $Al_2O_3$, 11-16 mol % RO, wherein RO is one or more of MgO, CaO, SrO, BaO and ZnO, 2-11 mol % $B_2O_3$; above 0 to 1 mol % Sn or $SnO_2$; and 0.1-1 mol % of the inorganic UV absorbers listed above. In another embodiment, the alkali-free aluminosilicate glass articles may comprise 0-3 mol % $P_2O_5$ or 0-2 mol % $P_2O_5$.

As stated above, some of the glass articles of the present disclosure are strengthened glass articles. Typically, glass articles, specifically alkali aluminosilicate glass articles, may be chemically strengthened by ion exchange. In this process, ions in the surface layer of the glass are replaced by—or exchanged with—larger ions having the same valence or oxidation state. In those embodiments in which the glass article comprises, consists essentially of, or consists of an alkali aluminosilicate glass, both the ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass is by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety. Further, the glass compositions of the present disclosure are down-drawable by processes known in the art, such as slot-drawing, fusion drawing, re-drawing, and the like, and have a liquidus viscosity of at least 130 kilopoise.

EXAMPLES

The experimental test samples, which include the compositions listed in Tables 1-5, were cut into 1 mm thick 1" diameter discs and the faces were polished. Spectra of the samples were taken via spectrophotometer before and after 16 min UV exposure (UVO cleaner model 7576 Jelight Co., Irvine Calif.). The graphical depictions of FIGS. 1-7 depict the visible spectra after UV exposure for various glasses.

As demonstrated in the present FIGS. and disclosure, the glass samples are compared based on the absorbance and induced absorbance metrics. Absorbance is calculated from the spectra using Beer's Law, wherein Absorbance=−log (transmittance). Induced absorbance in the samples is computed as follows: Induced absorbance (A)=−log(transmittance after test/transmittance before test)

TABLE 1

Alkali aluminosilicate glass samples containing various amounts of $TiO_2$. Absorbance vs. $TiO_2$ content is plotted for these samples in FIGS. 1-3.

|  | Ex. 1 | Ex. 2 | Ex. 3 | Ex. 4 | Ex. 5 | Ex. 6 | Ex. 7 | Ex. 8 | Ex. 9 | Comp Ex. 1 |
|---|---|---|---|---|---|---|---|---|---|---|
|  | Ex. # (wt. %) | | | | | | | | | |
| $SiO_2$ | 47.28 | 47.19 | 47.09 | 47 | 46.9 | 46.81 | 46.71 | 46.62 | 46.52 | 47.93 |
| $Al_2O_3$ | 23.1 | 23.09 | 23.09 | 23.08 | 23.08 | 23.07 | 23.07 | 23.06 | 23.05 | 23.31 |
| $P_2O_5$ | 13.14 | 13.13 | 13.13 | 13.12 | 13.12 | 13.12 | 13.11 | 13.11 | 13.11 | 12.73 |
| $Na_2O$ | 14.54 | 14.54 | 14.53 | 14.53 | 14.52 | 14.52 | 14.52 | 14.51 | 14.51 | 14.37 |
| MgO | 1.56 | 1.56 | 1.56 | 1.56 | 1.55 | 1.55 | 1.55 | 1.55 | 1.55 | 1.56 |
| $SnO_2$ | 0.21 | 0.21 | 0.21 | 0.21 | 0.21 | 0.21 | 0.21 | 0.21 | 0.21 | 0.11 |
| $TiO_2$ | 0.11 | 0.22 | 0.33 | 0.44 | 0.55 | 0.66 | 0.77 | 0.88 | 0.99 | 0.0053 |
| $Fe_2O_3$ | 0.01 | 0.01 | 0.01 | 0.01 | 0.01 | 0.01 | 0.01 | 0.01 | 0.01 | 0 |
| CaO | 0.05 | 0.05 | 0.05 | 0.05 | 0.05 | 0.05 | 0.05 | 0.05 | 0.05 | 0 |

TABLE 1-continued

Alkali aluminosilicate glass samples containing various amounts of $TiO_2$. Absorbance vs. $TiO_2$ content is plotted for these samples in FIGS. 1-3.

| | Ex. 1 | Ex. 2 | Ex. 3 | Ex. 4 | Ex. 5 | Ex. 6 | Ex. 7 | Ex. 8 | Ex. 9 | Comp Ex. 1 |
|---|---|---|---|---|---|---|---|---|---|---|
| $SO_3$ | 0 | 0 | 0 | 0 | 0 | 0 | 0 | 0 | 0 | 0 |
| Cl- | 0 | 0 | 0 | 0 | 0 | 0 | 0 | 0 | 0 | 0 |
| $K_2O$ | 0 | 0 | 0 | 0 | 0 | 0 | 0 | 0 | 0 | 0 |

Ex. # (mol %)

| | Ex. 1 | Ex. 2 | Ex. 3 | Ex. 4 | Ex. 5 | Ex. 6 | Ex. 7 | Ex. 8 | Ex. 9 | Comp Ex. 1 |
|---|---|---|---|---|---|---|---|---|---|---|
| $SiO_2$ | 57.31 | 57.21 | 57.11 | 57.01 | 56.91 | 56.81 | 56.71 | 56.61 | 56.51 | 57.5 |
| $Al_2O_3$ | 16.5 | 16.5 | 16.5 | 16.5 | 16.5 | 16.5 | 16.5 | 16.5 | 16.5 | 16.48 |
| $P_2O_5$ | 6.74 | 6.74 | 6.74 | 6.74 | 6.74 | 6.74 | 6.74 | 6.74 | 6.74 | 6.46 |
| $Na_2O$ | 16.64 | 16.64 | 16.64 | 16.64 | 16.64 | 16.64 | 16.64 | 16.64 | 16.64 | 16.71 |
| MgO | 2.81 | 2.81 | 2.81 | 2.81 | 2.81 | 2.81 | 2.81 | 2.81 | 2.81 | 2.79 |
| $SnO_2$ | 0.1 | 0.1 | 0.1 | 0.1 | 0.1 | 0.1 | 0.1 | 0.1 | 0.1 | 0.0056 |
| $TiO_2$ | 0.1 | 0.2 | 0.3 | 0.4 | 0.5 | 0.6 | 0.7 | 0.8 | 0.9 | 0.0048 |
| $Na_2O$ | 0.5 | 0.5 | 0.5 | 0.5 | 0.5 | 0.5 | 0.5 | 0.5 | 0.5 | 0 |

Figure 2:
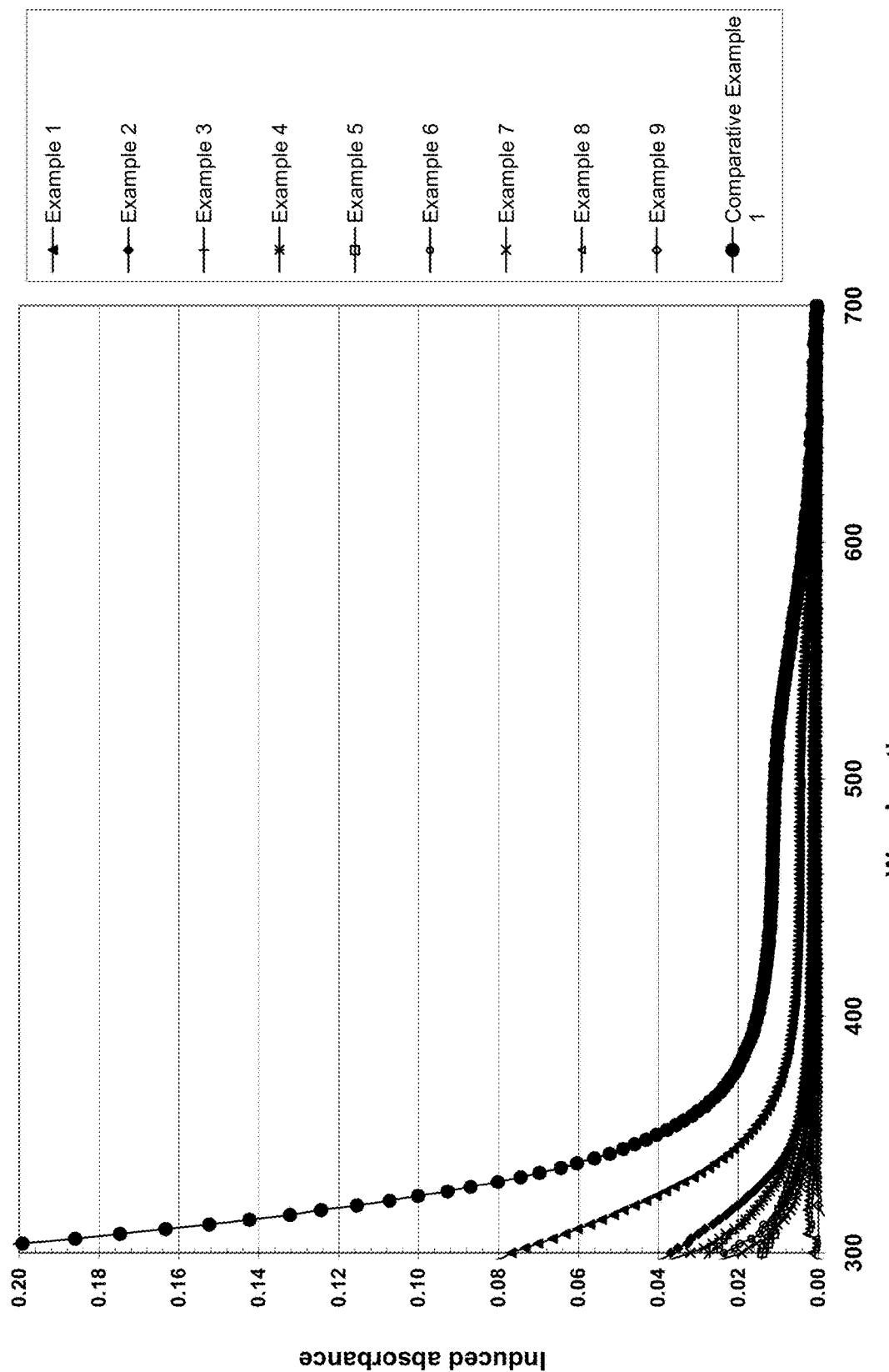
FIG. 2 is a graphical illustration depicting the effect of $TiO_2$ on the UV induced absorbance of the glasses in Table 1.
Figure 3:
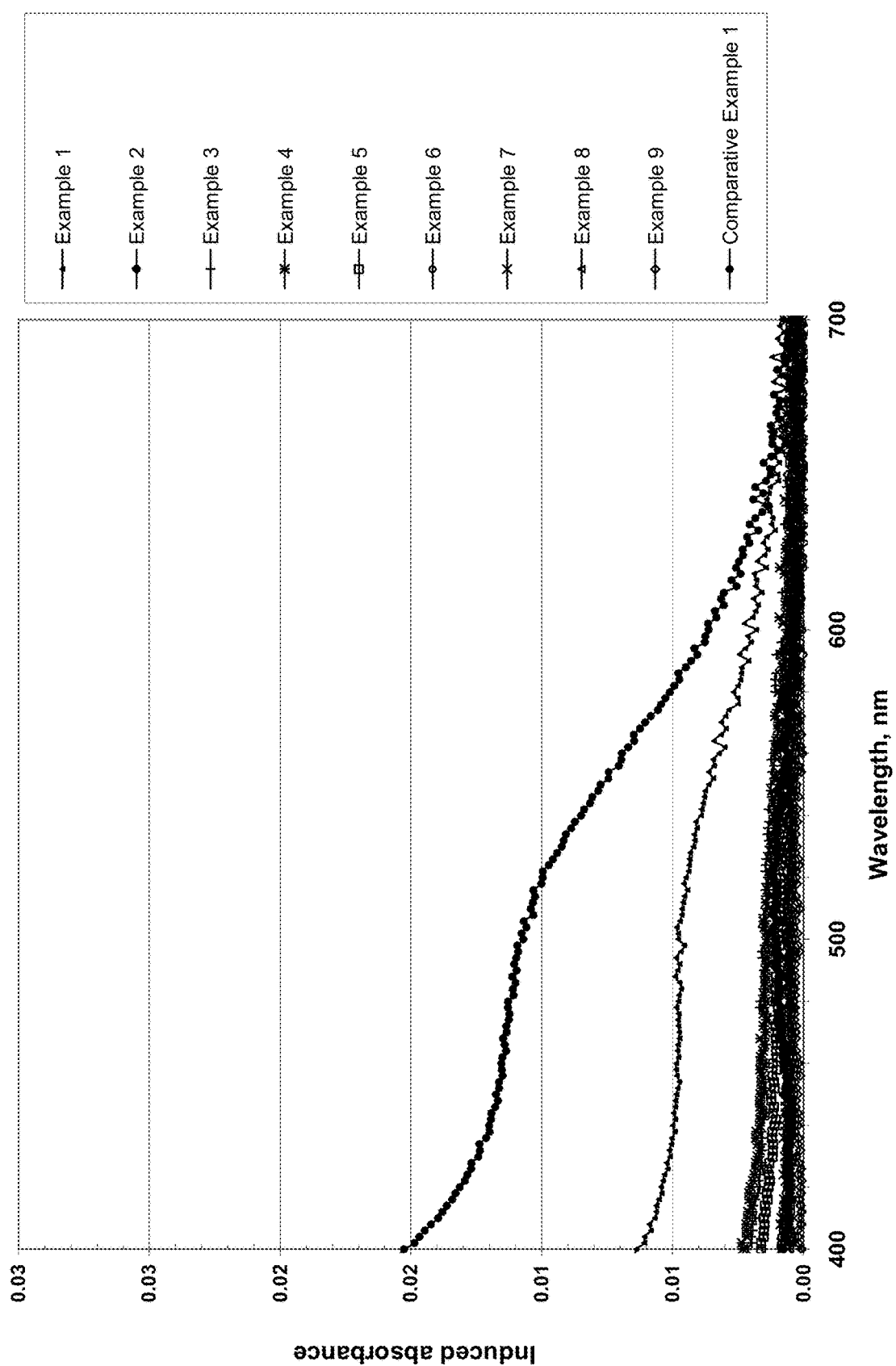
FIG. 3 is another graphical illustration depicting the effect of $TiO_2$ on the UV induced absorbance of the glasses in Table 1.

Referring to Examples 1-9, there is a compositional increase in $TiO_2$ from Example 1 to Example 9. Referring to FIG. 1, the addition of 0.1 $TiO_2$ in Example 1 increases the absorbance/mm at the UV wavelength of 270 nm from approximately 1.0 to 1.5 as compared to the $TiO_2$ free Comparative Example 1. Moreover, the increase in $TiO_2$ from Example 1 to Examples 2-9 increases the absorbance/mm at the UV wavelength of 270 nm from approximately 1.0 to at least 2.0. Similarly as shown in FIGS. 2 and 3, the addition of $TiO_2$ shows significant improvement in induced absorbance. As shown in FIG. 3, the addition of TiO2 greatly and desirably reduces the induced absorbance. Specifically, in Examples 2-9, the induced absorbance at 400 nm is close to 0.0, as compared to Comparative Example 1.

TABLE 2

Figure 4:
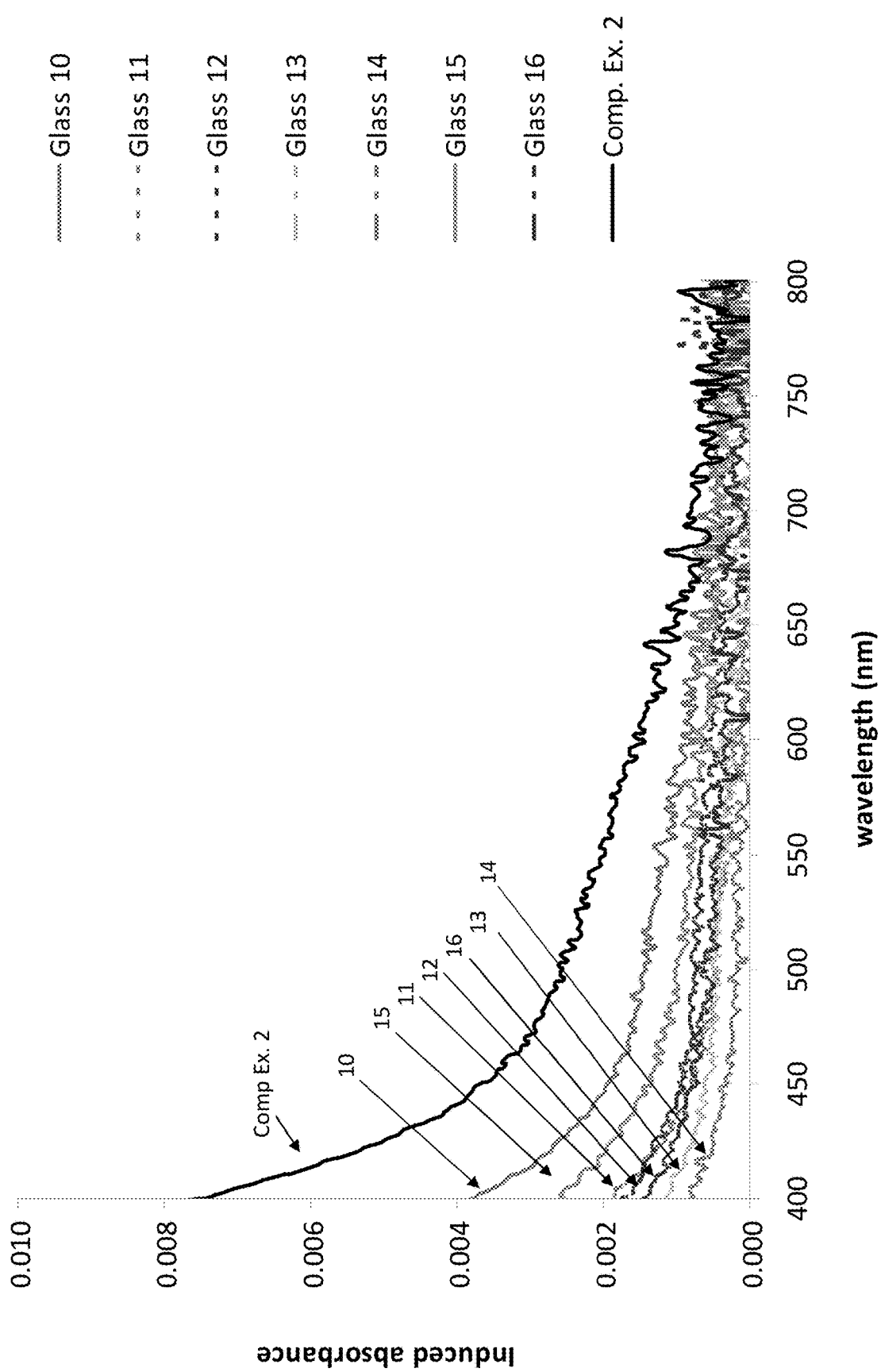
FIG. 4 is a graphical illustration depicting the effect of $TiO_2$ on the UV induced absorbance of the alkali-free display glasses of Table 3.

Alkaline earth aluminosilicate glass samples containing various amounts of TiO2. FIG. 4 depicts the impact of $TiO_2$ content is plotted for these samples.

Ex. # (mol %)

| | Ex. 10 | Ex. 11 | Ex. 12 | Ex. 13 | Ex. 14 | Ex. 15 | Ex. 16 | Comp Ex. 2 |
|---|---|---|---|---|---|---|---|---|
| $SiO_2$ | 67.19 | 67.11 | 67.02 | 66.95 | 66.87 | 70.80 | 70.57 | 67.28 |
| $B_2O_3$ | 9.99 | 9.99 | 9.99 | 9.99 | 9.99 | 0.95 | 0.95 | 9.99 |
| $Al_2O_3$ | 11.07 | 11.07 | 11.07 | 11.07 | 11.07 | 11.61 | 11.61 | 11.07 |
| MgO | 2.30 | 2.30 | 2.30 | 2.30 | 2.30 | 5.29 | 5.29 | 2.30 |
| CaO | 8.78 | 8.78 | 8.78 | 8.78 | 8.78 | 5.82 | 5.82 | 8.78 |
| $SnO_2$ | 0.07 | 0.07 | 0.07 | 0.07 | 0.07 | 0.10 | 0.10 | 0.07 |
| $TiO_2$ | 0.09 | 0.17 | 0.26 | 0.33 | 0.41 | 0.26 | 0.51 | 0.00 |
| SrO | 0.96 | 0.96 | 0.96 | 0.96 | 0.96 | 0.90 | 0.90 | 0.96 |
| BaO | 0.00 | 0.00 | 0.00 | 0.00 | 0.00 | 4.28 | 4.28 | 0.00 |

Referring to Examples 10-16 in Table 2 above, the increase in $TiO_2$ also reduces UV photodarkening in non-strengthened alkali-free display glass. As shown, there is a compositional increase in $TiO_2$ from Example 10 to Example 16. Referring to FIG. 4, the addition of $TiO_2$ in Examples 10-16 reduces the UV induced absorbance to less than 0.01 (1%) in the visible range of 400-450 nm whereas the $TiO_2$ free Comparative Example 2 is above 0.01 at 400 nm and only decreases to below 0.01 at longer visible wavelengths.

TABLE 3

Figure 5:
FIG. 5 is a graphical illustration depicting the effect of ZnO on the UV induced absorbance of the alkali aluminophosphosilicate glasses of Table 2.

Alkali aluminosilicate glass samples containing various amounts of ZnO.
FIG. 5 depicts the impact on UV photodarkening for ZnO content for the samples in Table 3.

Ex. # (mol %)

| | Ex. 17 | Ex. 18 | Ex. 19 | Comp. Ex. 3 |
|---|---|---|---|---|
| $SiO_2$ | 66.12 | 66.13 | 67.12 | 67.53 |
| $B_2O_3$ | 3.61 | 3.60 | 3.35 | 3.68 |
| $Al_2O_3$ | 12.71 | 12.70 | 12.00 | 12.68 |
| $P_2O_5$ | 0.00 | 0.00 | 0.00 | 0 |
| $Na_2O$ | 14.16 | 14.17 | 14.16 | 13.67 |
| $K_2O$ | 0.00 | 0.00 | 0.00 | 0 |
| MgO | 2.24 | 1.74 | 1.76 | 2.33 |
| CaO | 0.06 | 0.06 | 0.50 | 0 |
| $SnO_2$ | 0.09 | 0.09 | 0.09 | 0.1 |
| ZnO | 1.00 | 1.50 | 1.00 | 0 |
| $CeO_2$ | 0.00 | 0.00 | 0.00 | 0 |
| $Fe_2O_3$ | 0.01 | 0.01 | 0.01 | 0.01 |

Referring to Examples 17-19 in Table 3 above, the increase in ZnO reduces UV photodarkening. As shown in FIG. 5, the addition of ZnO in Examples 17-19 reduces the UV induced absorbance to less than 0.01 (1%) in the visible range of 400-700 nm whereas the ZnO-free Comparative Example 3 is above 0.01 at 400 nm and only decreases to below 0.01 at longer visible wavelengths; i.e., at about 600 nm and greater.

TABLE 4

Figure 6:
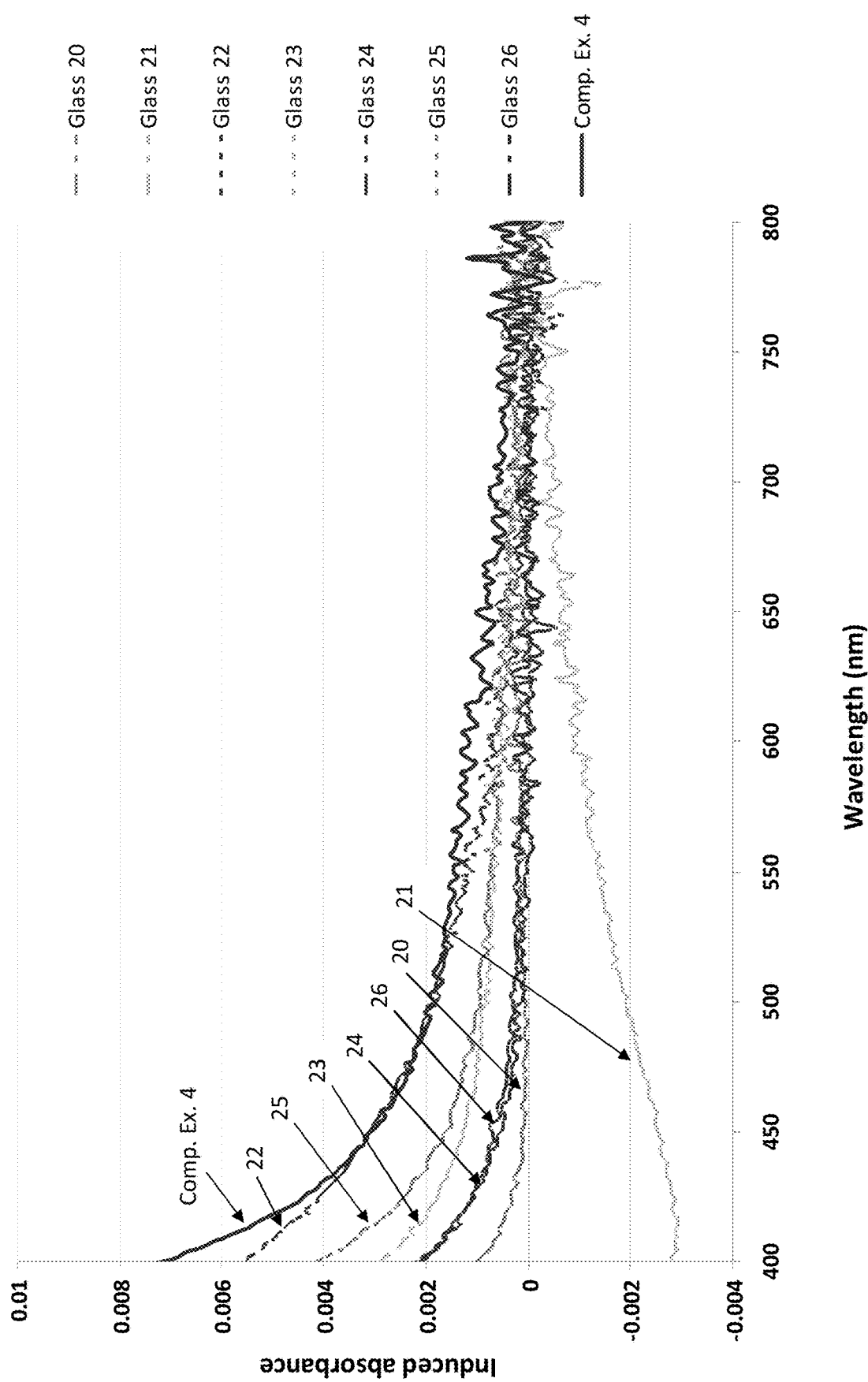
FIG. 6 is a graphical illustration depicting the effect of ZnO on the UV induced absorbance of the alkali aluminoborosilicate glasses of Table 4.

Alkali-free glass samples containing various amounts of ZnO.
FIG. 6 depicts the impact on UV photodarkening for ZnO content for the samples in Table 4.

Ex. # (mol %)

| | Ex. 20 | Ex. 21 | Ex. 22 | Ex. 23 | Ex. 24 | Ex. 25 | Ex. 26 | Comp. Ex. 4 |
|---|---|---|---|---|---|---|---|---|
| $SiO_2$ | 71.04 | 71.04 | 71.04 | 71.04 | 71.04 | 71.04 | 71.04 | 71.04 |
| $B_2O_3$ | 0.95 | 0.95 | 0.95 | 0.95 | 0.95 | 0.95 | 0.95 | 0.95 |
| $Al_2O_3$ | 11.61 | 11.61 | 11.61 | 11.61 | 11.61 | 11.61 | 11.61 | 11.61 |
| MgO | 2.50 | 0.00 | 5.29 | 5.29 | 5.29 | 5.29 | 2.50 | 5.29 |
| CaO | 5.82 | 5.82 | 0.00 | 5.82 | 5.82 | 5.82 | 3.00 | 5.82 |

TABLE 4-continued

Alkali-free glass samples containing various amounts of ZnO.
FIG. 6 depicts the impact on UV photodarkening for ZnO content for the samples in Table 4.

| | Ex. # (mol %) | | | | | | | |
|---|---|---|---|---|---|---|---|---|
| | Ex. 20 | Ex. 21 | Ex. 22 | Ex. 23 | Ex. 24 | Ex. 25 | Ex. 26 | Comp. Ex. 4 |
| $SnO_2$ | 0.10 | 0.10 | 0.10 | 0.10 | 0.10 | 0.10 | 0.10 | 0.10 |
| ZnO | 2.80 | 5.30 | 5.82 | 2.28 | 4.28 | 0.91 | 8.80 | 0.00 |
| SrO | 0.91 | 0.91 | 0.91 | 0.91 | 0.91 | 0.00 | 0.00 | 0.91 |
| BaO | 4.28 | 4.28 | 4.28 | 2.00 | 0.00 | 4.28 | 2.00 | 4.28 |

Referring to Examples 20-26 in Table 4 above, the increase in ZnO also reduces UV photodarkening in non-strengthened alkali-free display glasses. As shown in FIG. 6, the addition of ZnO in Examples 20-26 reduces the UV induced absorbance to less than 0.01 (1%) in the visible range of 400-700 nm, whereas the induced absorbance of ZnO-free Comparative Example 4 is above 0.01 at 400 nm and only decreases to below 0.01 at longer visible wavelengths

TABLE 5

Figure 7:
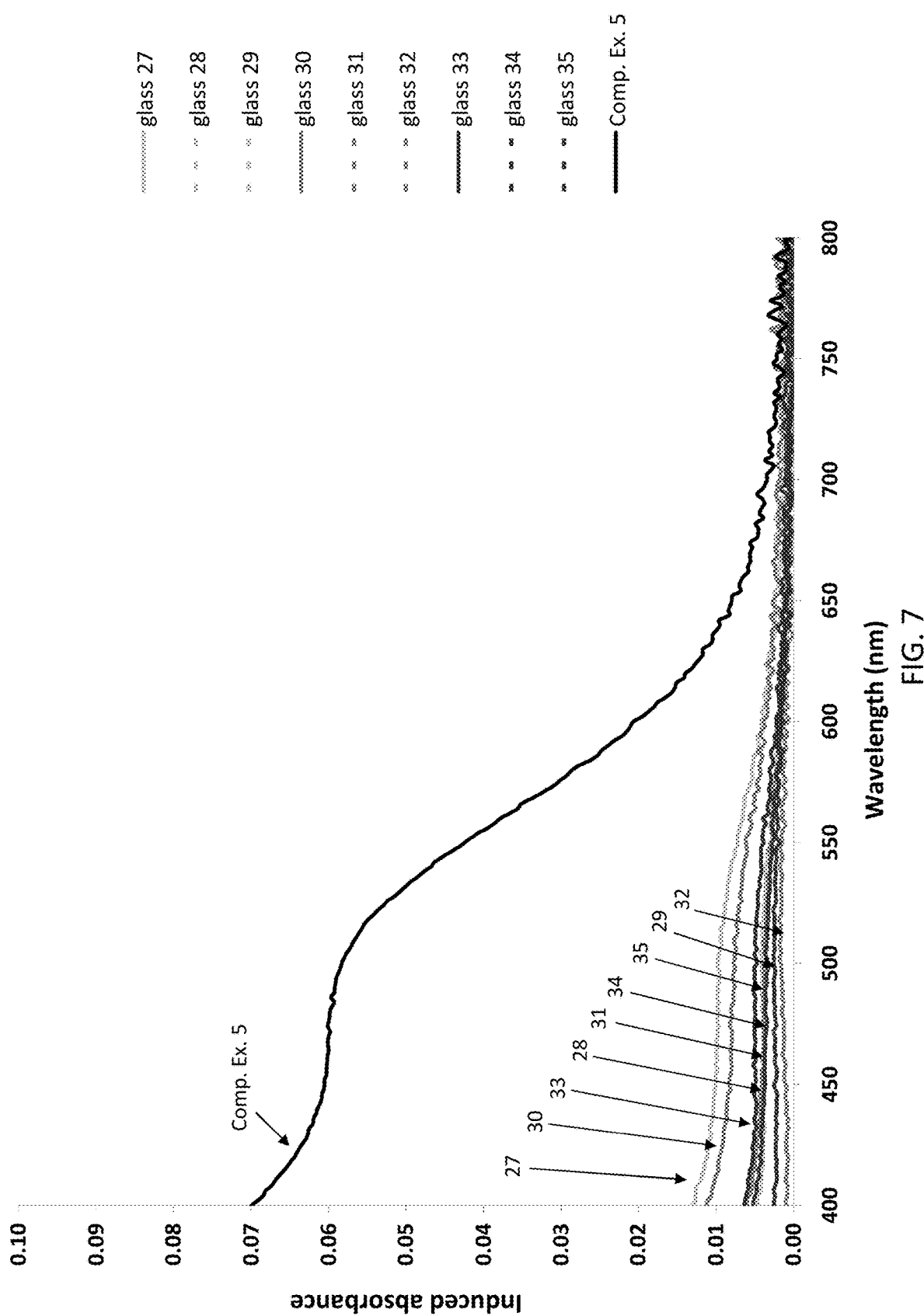
FIG. 7 is a graphical illustration depicting the effect of ZnO on the UV induced absorbance of the alkali-free glasses of Table 5.

Alkali aluminosilicate glass samples containing various amounts of ZnO.
FIG. 7 depicts the impact of ZnO and $TiO_2$ on the alkali aluminophosphosilicate glasses of Table 5.

| | Ex. # (mol %) | | | | | | | | | |
|---|---|---|---|---|---|---|---|---|---|---|
| | Ex. 27 | Ex. 28 | Ex. 29 | Ex. 30 | Ex. 31 | Ex. 32 | Ex. 33 | Ex. 34 | Ex. 35 | Comp Ex. 5 |
| $SiO_2$ | 57.54 | 57.62 | 57.46 | 57.57 | 57.78 | 57.60 | 57.82 | 57.60 | 57.53 | 57.72 |
| $B_2O_3$ | 0.00 | 0.00 | 0.00 | 0.00 | 0.00 | 0.00 | 0.00 | 0.00 | 0.00 | 0.00 |
| $Al_2O_3$ | 15.93 | 15.89 | 15.96 | 15.91 | 16.02 | 15.98 | 15.97 | 15.89 | 15.98 | 16.49 |
| $P_2O_5$ | 6.51 | 6.47 | 6.42 | 6.52 | 6.28 | 6.39 | 6.38 | 6.49 | 6.52 | 6.42 |
| $Na_2O$ | 16.95 | 16.91 | 16.94 | 17.00 | 16.86 | 16.87 | 16.90 | 16.94 | 16.88 | 16.52 |
| $K_2O$ | 0.01 | 0.01 | 0.01 | 0.01 | 0.01 | 0.01 | 0.01 | 0.01 | 0.01 | 0.03 |
| MgO | 1.88 | 1.82 | 1.82 | 0.84 | 0.81 | 0.82 | 0.31 | 0.33 | 0.32 | 2.73 |
| CaO | 0.04 | 0.05 | 0.04 | 0.03 | 0.04 | 0.03 | 0.03 | 0.03 | 0.03 | 0.03 |
| $SnO_2$ | 0.07 | 0.07 | 0.07 | 0.07 | 0.06 | 0.06 | 0.06 | 0.06 | 0.06 | 0.05 |
| ZnO | 0.98 | 0.96 | 0.97 | 1.96 | 1.92 | 1.94 | 2.41 | 2.44 | 2.44 | 0.00 |
| $TiO_2$ | 0.10 | 0.19 | 0.29 | 0.09 | 0.20 | 0.29 | 0.10 | 0.19 | 0.29 | 0.00 |
| $CeO_2$ | 0.00 | 0.00 | 0.00 | 0.00 | 0.00 | 0.00 | 0.00 | 0.00 | 0.00 | 0.00 |
| $Fe_2O_3$ | 0.01 | 0.01 | 0.01 | 0.01 | 0.01 | 0.01 | 0.01 | 0.01 | 0.01 | 0.01 |

Referring to Examples 27-35 in Table 5 above, the increase in ZnO and $TiO_2$ synergistically decreases UV photodarkening from about 0.06 (6%) at 400 nm for the Comparative Example 5 to almost 0 for Example 35, which has 2.44 mol % ZnO and 0.29 mol % $TiO_2$.

Without being bound by theory, Zn containing phosphate glasses may be very stable when exposed to UV light, as well as X-ray radiation. Comparative Example 5 contains MgO, which is replaced primarily with ZnO. UV exposure photoreduces $Fe^{3+}$ to $Fe^{2+}$ by accepting an electron. The MgO may then stabilize the yielded $Fe^{2+}$ and detrimentally promotes phosphorus-oxygen hole center (POHC) generation. Under UV exposure, these electrons may be excited, then forming electron color centers and/or hole centers. These color centers will absorb light in specific wavelengths, especially the visible range thereby resulting in discoloration. The POHC population may also significantly increase after treatment with an oxygen plasma process. Here, by replacing the MgO with ZnO, this MgO stabilization of $Fe^{2+}$ is minimized, thereby substantially minimizing the number of electron color centers which lead to discoloration in the visible range.

TABLE 6

Figure 8:
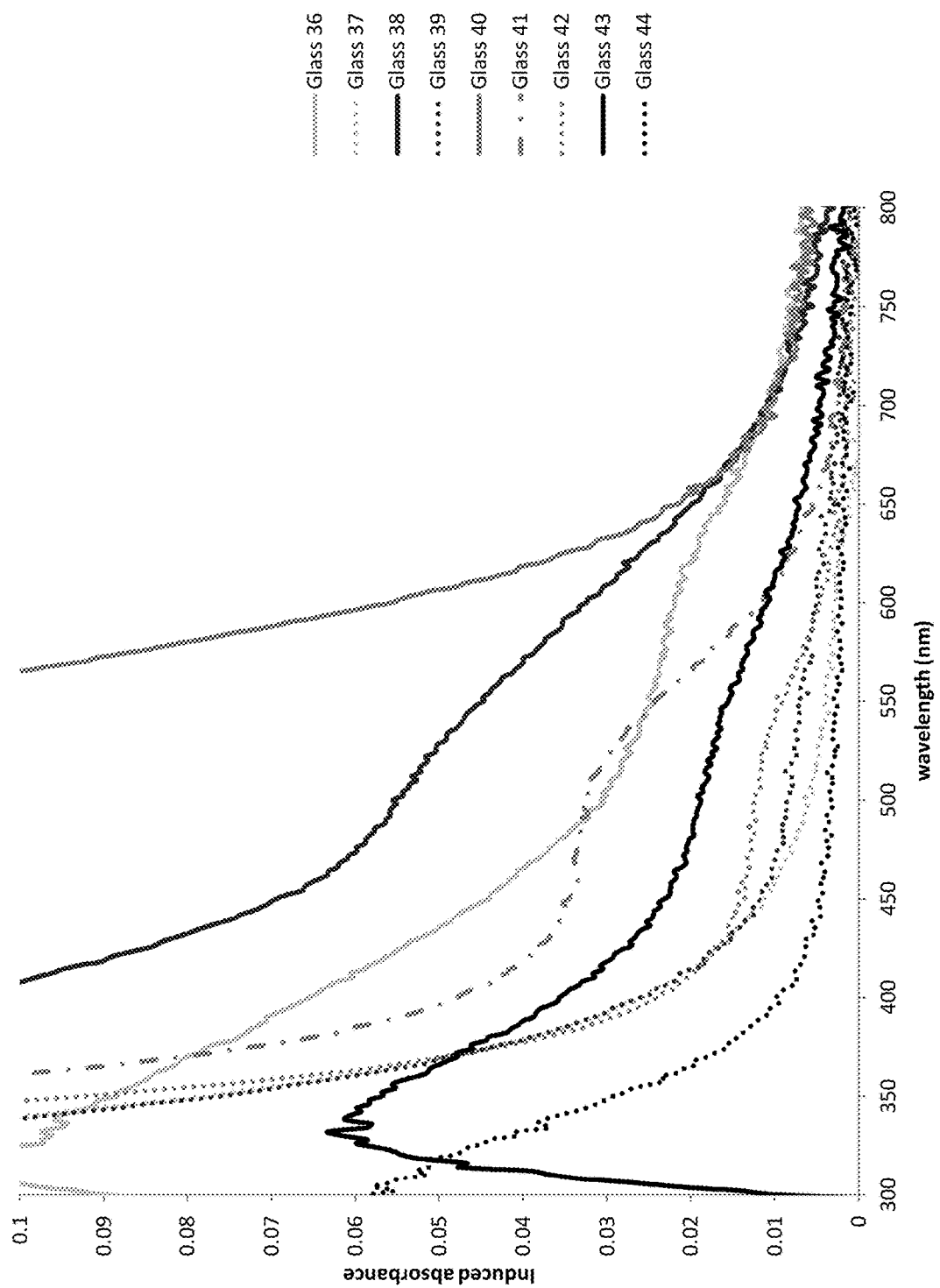
FIG. 8 is a graphical illustration depicting the effect of $SnO_2$ on the UV induced absorbance of the alkali-free glasses of Table 6.

Alkali aluminosilicate glass samples containing various amounts of $SnO_2$.
FIG. 8 depicts the impact of $SnO_2$ on the alkali aluminophosphosilicate glasses of Table 6.

| Mol % | Alkali Alumino-silicate Glass | | Alkali Alumino-boro-silicate Glass | | Alkali Aluminophospho-silicate Glass | | | Display Glass | |
|---|---|---|---|---|---|---|---|---|---|
| | Glass 36 | Glass 37 | Glass 38 | Glass 39 | Glass 40 | Glass 41 | Glass 42 | Glass 43 | Glass 44 |
| $SiO_2$ | 68.67 | 68.47 | 67.02 | 66.82 | 57.23 | 56.90 | 56.8 | 67.55 | 67.55 |
| Al2O3 | 10.27 | 10.27 | 12.66 | 12.66 | 16 | 16.1 | 16.1 | 11.1 | 11.1 |
| MgO | 5.36 | 5.36 | 2.36 | 2.36 | 2.91 | 2.81 | 2.81 | 2.26 | 2.26 |
| Na2O | 15.7 | 15.7 | 14.23 | 14.23 | 17.17 | 17.55 | 17.55 | 0 | 0 |
| SnO2 | 0 | 0.2 | 0 | 0.2 | 0 | 0.1 | 0.2 | 0 | 0.2 |
| B2O3 | 0 | 0 | 3.73 | 3.73 | 0 | 0 | 0 | 9.83 | 9.83 |
| P2O5 | 0 | 0 | 0 | 0 | 6.67 | 6.54 | 6.54 | 0 | 0 |
| CaO | 0 | 0 | 0 | 0 | 0 | 0 | 0 | 8.76 | 8.76 |
| SrO | 0 | 0 | 0 | 0 | 0 | 0 | 0 | 0.5 | 0.5 |

Referring to Examples 36-44 in Table 6 above, the increase in $SnO_2$ synergistically decreases UV photodarkening for all types of glasses, e.g., alkali aluminosilicate glass (Examples 36 and 37), alkali aluminoborosilicate glass (Examples 38 and 39), and alkali aluminophosphosilicate glass (Examples 40-42), alkali-free display glass (Examples 43 and 44). Comparing the alkali aluminosilicate glass examples, sample 36, which includes 0 mol % SnO2, has an induced absorbance of about 0.06 at 400 nm, whereas sample 37, which includes 0.2 mol % $SnO_2$, has an induced absorbance of about 0.02 at 400 nm. Similarly, alkali aluminoborosilicate glass sample 38, which includes 0 mol % $SnO_2$, has an induced absorbance of about 0.12 at 400 nm, whereas alkali aluminoborosilicate glass sample 39, which includes 0.2 mol % $SnO_2$, has an induced absorbance of about 0.02 at 400 nm.

The most marked improvement is demonstrated for alkali aluminophosphosilicate glass samples. Specifically, sample 40, which includes 0 mol % $SnO_2$, has an induced absorbance of about 0.16 at 400 nm, whereas alkali aluminophosphosilicate glass sample 41, which includes 0.1 mol % $SnO_2$, has an induced absorbance of about 0.04 at 400 nm.

Moreover, alkali aluminophosphosilicate glass sample 42, which includes even more $SnO_2$, 0.2 mol % $SnO_2$, has an induced absorbance of about 0.02 at 400 nm. Like the ion exchanged alkali containing glasses (Examples 36-42), the $SnO_2$ also reduces photodarkening in alkali-free non-strengthened display glasses (Examples 43 and 44). Specifically, sample 43, which includes 0 mol % $SnO_2$, has an induced absorbance of about 0.04 at 400 nm, whereas display glass sample 44, which includes 0.2 mol % $SnO_2$, has an induced absorbance of about 0.01 at 400 nm.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A glass article having a thickness 1.3 mm, wherein the glass article comprises
   54-75 mol % $SiO_2$,
   11-17 mol % $Al_2O_3$;
   0.1-9 mol % $B_2O_3$;
   optionally $P_2O_5$, wherein 0.1 mol % $\leq B_2O_3+P_2O_5 \leq 19$ mol %;
   10-20 mol % $R_2O$, wherein $R_2O$ comprises one or more of $Na_2O$, $K_2O$, and $Li_2O$;
   Above 0 to 1 mol % $SnO_2$;
   0.5-10 mol % ZnO; and
   the sum of $Al_2O_3+B_2O_3+P_2O_5 < 16$ mol %.

2. The glass article of claim 1 wherein the glass article comprises $P_2O_5$.

3. The glass article of claim 1 wherein the glass article comprises 63-75 mol % $SiO_2$ and 11-14 mol % $Al_2O_3$.

4. The glass article of claim 1 wherein the glass article comprises 2-9 mol % $B_2O_3$.

5. The glass article of claim 1 wherein the glass article comprises 1-10 mol % ZnO.

6. The glass article of claim 1 wherein the glass article comprises 0.05-1 mol % $SnO_2$.

7. The glass article of claim 1 wherein the glass article comprises 0.5-17 mol % of RO, wherein RO is one or more of MgO, CaO, SrO, ZnO, and BaO.

8. The glass article of claim 1 wherein the glass article comprises 54-65 mol % $SiO_2$, 11-17 mol % $Al_2O_3$, 0.1-8 mol % $B_2O_3$, 0-4 mol % RO, 0-7 mol % $P_2O_5$, 13-19 mol % $R_2O$, and the sum of $Al_2O_3+B_2O_3+P_2O_5 > 19$ mol %.

9. The glass article of claim 1 wherein the sum of $Al_2O_3+B_2O_3+P_2O_5 > 19$ mol %.

10. The glass article of claim 1 wherein the glass article is defined by an equation: $-3.5 < R_2O+RO-Al_2O_3 < 10$.

11. The glass article of claim 1 wherein the glass article has an induced absorbance of less than 0.01 for at least one wavelength from 400 to 700 nm.

12. The glass article of claim 1 wherein the thickness of the glass article is 0.1-1.0 mn.

13. The glass article of claim 1 wherein the glass article is a strengthened glass article.

14. A device comprising the glass article of claim 1.

* * * * *

UNITED STATES PATENT AND TRADEMARK OFFICE
CERTIFICATE OF CORRECTION

PATENT NO. : 11,498,865 B2
APPLICATION NO. : 16/681960
DATED : November 15, 2022
INVENTOR(S) : Dana Craig Bookbinder et al.

It is certified that error appears in the above-identified patent and that said Letters Patent is hereby corrected as shown below:

On the Title Page

Item (56), in Column 2, under "Other Publications", Line 1, delete "Ation" and insert -- Action --.

Page 2, item (56), in Column 2, under "Other Publications", Line 13, delete "flouride-phosphate" and insert -- fluoride-phosphate --.

In the Claims

In Column 11, Line 27, in Claim 1, delete "1.3" and insert -- $\leq 1.3$ --.

In Column 12, Line 30, in Claim 12, delete "mn." and insert -- mm. --.

Signed and Sealed this
Twenty-first Day of March, 2023

Katherine Kelly Vidal
*Director of the United States Patent and Trademark Office*